May 13, 1958     K. H. FOX     2,834,897
DYNAMOELECTRIC MACHINE COOLING
Filed Dec. 21, 1953
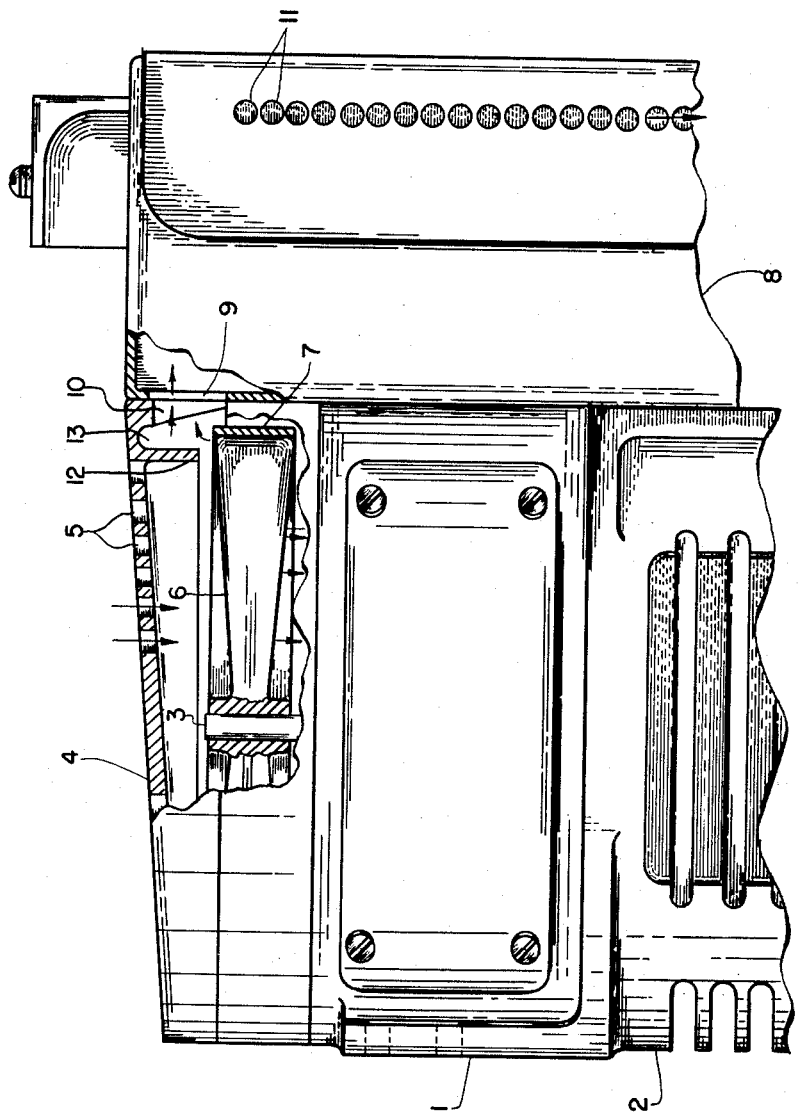
INVENTOR.
KENNETH H. FOX
BY
ATTORNEY

2,834,897
DYNAMOELECTRIC MACHINE COOLING

Kenneth H. Fox, Fair Haven, N. J., assignor to Bendix Aviation Corporation, Eatontown, N. J., a corporation of Delaware Application December 21, 1953, Serial No. 399,389

4 Claims. (Cl. 310—59)

The present invention relates to dynamoelectric machines and more particularly to the cooling of dynamoelectric machines and associated control equipment.

It has been found that in the course of high altitude operation of dynamoelectric machines that the control equipment associated therewith has a tendency to become overheated and some means for cooling are necessary. In some applications, for example in an inverter, the control equipment is mounted in a control box directly on the machine. Heretofore, air has been bled from the rotary section of the machine at a point beyond the commutator. In this method, however, a large amount of heat has been picked up from the rotary section so that the temperature of the air entering the control box is quite high and is not sufficient to provide proper cooling.

In the present invention, means are provided for diverting a flow of air in the reverse direction from the cooling fan into the control box. It has been found that with the types of fans normally used on inverters there is a considerable amount of air flowing in the reverse direction to the standard flow, and the temperature of this air is substantially that of the surrounding ambient temperature. By diverting this flow of air, which would normally be wasted, so that it enters the control box, sufficient cooling air is provided.

It is an object of the present invention to provide novel means for cooling control equipment of a dynamoelectric machine.

Another object of the invention is to provide an improved method of cooling for a dynamoelectric machine.

Another object of the invention is to provide improved means for operating a dynamoelectric machine at high altitudes.

These and other objects and features of the invention will appear more fully hereinafter from a consideration of the following description taken in connection with the accompanying drawings wherein one embodiment of the invention is illustrated by way of an example.

In the drawings the single figure is a partial view of a dynamoelectric machine and associated control boxes having a section thereof cut away to illustrate the invention.

Referring now to the drawing, a dynamoelectric machine is indicated by the numeral 1, which for the purpose of illustration, may be an inverter. The dynamoelectric machine 1 has a housing 2, which includes a stator section (not shown) and a rotary section 3. The stator section and rotary section may be of any conventional type and are not illustrated in detail for purposes of simplification. The housing 2 has an end section or fan guard 4 having openings 5 therein to admit air. Mounted on the rotary section 3 is a fan 6 which may be of the multi-blade type and has an outer rim 7. The fan 6 may be secured to the rotary member 3 by any conventional means.

Mounted on the housing 2 is a control box 8 which may house conventional voltage and frequency regulating equipment. The housing 8 has an opening 9 in register with an opening 10 in member 4. A plurality of holes 11 are provided in the control box 8.

A novel feature of the present invention is the provision of a circumferential flange 12 extending inwardly adjacent to the outer circumference of the member 4. The flange 12 together with the outer edge of member 4 forms a circumferential channel 13 which is connected to the opening 10.

In operation, the fan 6 is rotated by the rotatable member 3 in a direction so that a normal flow of air is provided in the housing 2. A reverse direction flow of air from the fan 6 is directed by the channel 13 to the openings 10 and 9 into the control box 8. The holes 11 provide means for the escape of the air from the control box 8. The flange 12 is located just below the outer circumference of the fan and serves as a deflecting member or air scoop for the reverse air flow. This arrangement permits the use of air which would normally be wasted and provides cooling air that is substantially of the same temperature as the surrounding ambient temperature.

While a fan has been illustrated as having an outer rim, it is understood that the present invention would work equally as well with a fan having no outer rim.

Also, it is understood that the invention is not limited to supplying air to a control box located on the machine, but may be utilized to cool other apparatus located adjacent to the machine.

Although only one embodiment of the invention was illustrated, and described, various changes in the form and relative arrangement of the parts may be made to suit requirements.

What is claimed is:

1. A dynamoelectric machine, comprising a housing, a rotatable member mounted inside said housing, a control box mounted on said housing, a fan mounted on said rotatable member adjacent one end of said housing and adapted to provide a flow of air into said dynamoelectric machine, the normal flow of air from said fan being towards the other end of said housing over said rotatable member and having a reverse flow of air around the outer circumference thereof, a circumferential channel positioned adjacent said fan on the side away from said normal air flow with the center of said channel being substantially in line with the outer circumference of said fan, and means connecting said channel to said control box whereby air flow in a reverse direction from said fan is diverted into said control box.

2. A dynamoelectric machine comprising a rotatable member, a housing enclosing said rotatable member, a control box for housing control equipment for said dynamoelectric machine, said control box being mounted on said housing, a fan mounted on said rotatable member adjacent one end of said housing for providing a flow of coolant into said housing, the normal flow of coolant from said fan being into said housing towards the other end thereof and having a reverse flow around the outer circumference thereof, and means for diverting said reverse flow into said control box.

3. A method of cooling a control box mounted on a dynamoelectric machine having a cooling fan associated therewith, said fan having a normal flow towards said dynamoelectric machine and a reverse flow around the perimeter thereof; comprising diverting the reverse flow from said fan into said control box.

4. In a dynamoelectric machine having a housing and a control box mounted thereon, the combination comprising a fan positioned adjacent one end of said housing and connected for rotation by said dynamoelectric machine, said fan being adapted to provide a flow of coolant into said housing towards the other end thereof and a flow of coolant around the perimeter thereof outward from said housing, and means including a circumferential channel for diverting said last flow of coolant into said control box.

References Cited in the file of this patent

UNITED STATES PATENTS

| | | |
|---|---|---|
| 1,858,261 | Barnholdt | May 17, 1932 |
| 2,383,669 | Moore | Aug. 28, 1945 |
| 2,386,597 | Course | Oct. 9, 1945 |
| 2,393,933 | Poole | Jan. 29, 1946 |

FOREIGN PATENTS

| | | |
|---|---|---|
| 589,762 | Germany | Dec. 13, 1933 |
| 632,663 | Germany | July 11, 1936 |
| 723,694 | Germany | Aug. 8, 1942 |